US010436190B2

United States Patent
Hopkins

(10) Patent No.: US 10,436,190 B2
(45) Date of Patent: Oct. 8, 2019

(54) RELIEF VALVE ASSEMBLY AND COMPONENTS THEREOF

(71) Applicant: Flow International Corporation, Kent, WA (US)

(72) Inventor: Jordan J. Hopkins, Seattle, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 16/040,328

(22) Filed: Jul. 19, 2018

(65) Prior Publication Data
US 2018/0320682 A1 Nov. 8, 2018

Related U.S. Application Data

(63) Continuation of application No. 14/371,406, filed as application No. PCT/US2013/021262 on Jan. 11, 2013, now Pat. No. 10,054,118.
(Continued)

(51) Int. Cl.
*F04B 49/035* (2006.01)
*F04B 49/24* (2006.01)
(Continued)

(52) U.S. Cl.
CPC ............ *F04B 49/035* (2013.01); *B26F 3/004* (2013.01); *F04B 49/24* (2013.01); *F04B 53/10* (2013.01);
(Continued)

(58) Field of Classification Search
CPC ........ F04B 49/24; F04B 49/035; F04B 53/10; F04B 53/1087; F16K 15/02; F16K 17/00;
(Continued)

(56) References Cited

U.S. PATENT DOCUMENTS 1,716,722 A 6/1929 Fausek et al.
1,807,594 A 6/1931 Hopkins
(Continued)

FOREIGN PATENT DOCUMENTS

DE 25 41 155 A1 9/1976
DE 2541155 A1 * 9/1976 ......... F16K 17/0466
(Continued)

OTHER PUBLICATIONS

English Description Translation of DE-2541155-A1 dated 1976 (Year: 1976).*

*Primary Examiner* — Nathan C Zollinger
(74) *Attorney, Agent, or Firm* — Cozen O'Connor

(57) ABSTRACT

A relief valve assembly is provided for use in connection with high pressure and ultrahigh pressure pumps. The relief valve assembly includes a valve pin having an engagement portion with a tapered surface and a valve seat having a valve pin receiving aperture defining a tapered surface on the valve seat to sealingly mate with the engagement portion of the valve pin when the valve pin is seated against the valve seat in a seated configuration. The valve seat further includes at least one bypass passage that extends from the valve pin receiving aperture to an exterior surface of the valve seat such that when the valve pin is displaced away from the seated configuration fluid can pass through the bypass passage and an annular space created between the engagement portion of the valve pin and the valve seat. Systems incorporating the relief valve assembly are also provided.

24 Claims, 2 Drawing Sheets

Related U.S. Application Data

(60) Provisional application No. 61/588,392, filed on Jan. 19, 2012.

(51) Int. Cl.
| | |
|---|---|
| *F04B 53/10* | (2006.01) |
| *F16K 17/04* | (2006.01) |
| *F16K 31/122* | (2006.01) |
| *B26F 3/00* | (2006.01) |
| *F16K 15/02* | (2006.01) |
| *F16K 47/04* | (2006.01) |

(52) U.S. Cl.
CPC ........ F04B 53/1087 (2013.01); F16K 15/021 (2013.01); F16K 17/0466 (2013.01); F16K 31/122 (2013.01); F16K 47/04 (2013.01); *Y10T 137/7849* (2015.04)

(58) Field of Classification Search
CPC ...... F16K 15/06; F16K 15/063; F16K 15/021; F16K 17/0466; F16K 17/06; F16K 31/122; F16K 47/04; B26F 3/004; Y10T 137/7849
USPC ..... 417/307; 251/121, 122, 903; 137/625.33
See application file for complete search history.

(56) References Cited

U.S. PATENT DOCUMENTS

| | | | |
|---|---|---|---|
| 2,720,838 A * | 10/1955 | Dahl | F04D 15/0011 417/303 |
| 2,730,125 A | 1/1956 | Thatcher et al. | |
| 4,114,851 A * | 9/1978 | Shivak | F16K 1/38 251/122 |
| 4,620,562 A * | 11/1986 | Pacht | F16K 31/363 137/315.05 |
| 4,679,592 A | 7/1987 | Lamb | |
| 5,564,469 A * | 10/1996 | Tremoulet, Jr. | F04B 49/24 137/540 |
| 6,588,724 B2 | 7/2003 | Yie | |
| 6,796,741 B1 * | 9/2004 | DeVaull, III | B09C 1/002 137/516.13 |
| 6,863,475 B2 | 3/2005 | DeVaull, III et al. | |
| 7,832,653 B2 * | 11/2010 | Yukimoto | F16K 47/04 236/92 B |
| 10,054,118 B2 * | 8/2018 | Hopkins | F04B 49/24 |
| 2003/0106594 A1 | 6/2003 | Saurwein et al. | |
| 2006/0151031 A1 | 7/2006 | Krenzer et al. | |
| 2010/0206388 A1 * | 8/2010 | Bielab | F16K 31/0644 137/12 |
| 2014/0311596 A1 | 10/2014 | Kim et al. | |

FOREIGN PATENT DOCUMENTS

| | | |
|---|---|---|
| DE | 102 60 662 A1 | 7/2004 |
| EP | 2 851 589 A1 | 3/2015 |
| EP | 3 023 675 A1 | 5/2016 |
| GB | 1 214 863 | 12/1970 |
| JP | 49-81920 | 8/1974 |
| WO | 2013/109473 A1 | 7/2013 |

\* cited by examiner

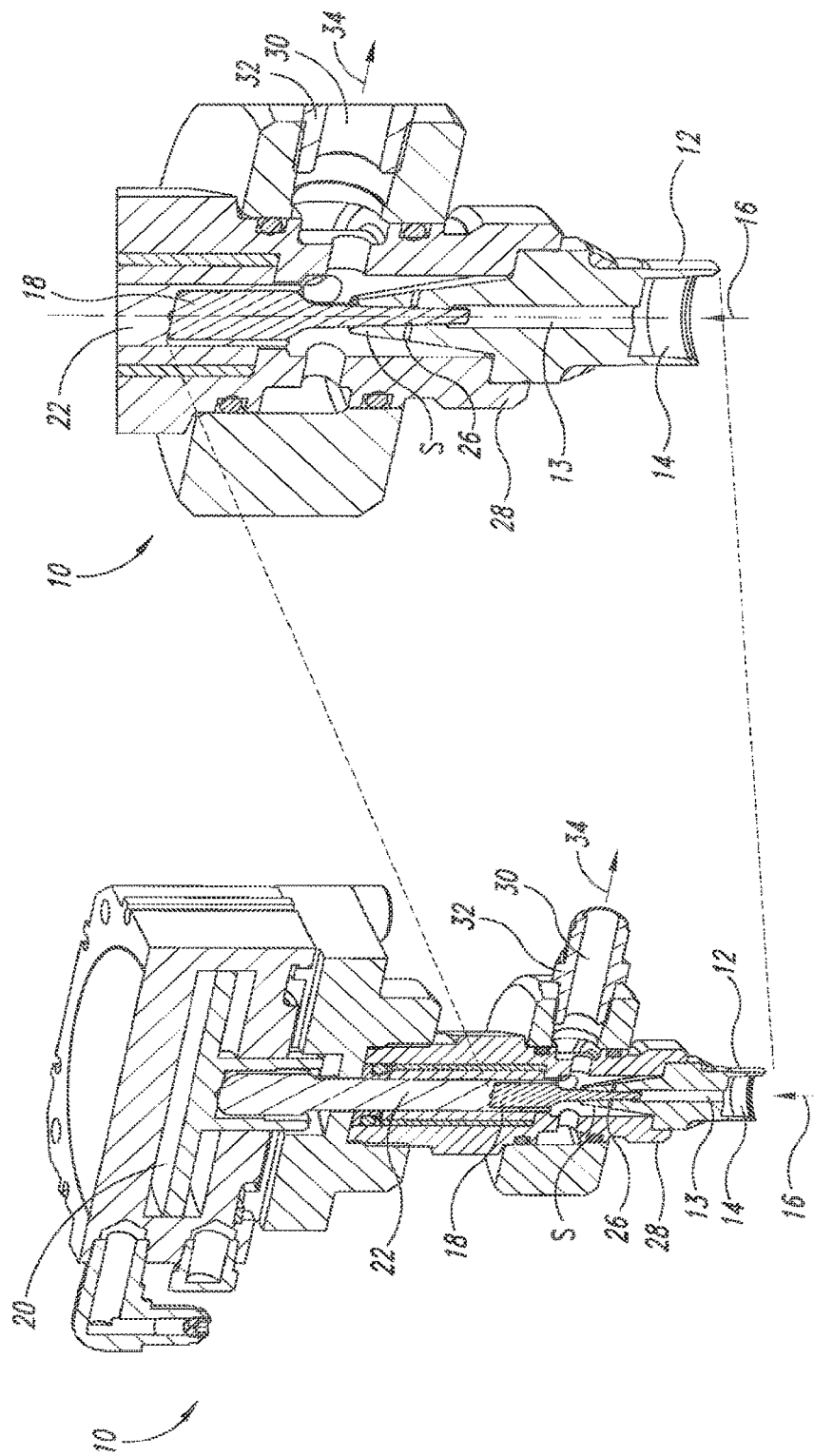

RELIEF VALVE ASSEMBLY AND COMPONENTS THEREOF

RELATED APPLICATIONS

This application is a continuation of U.S. patent application Ser. No. 14/371,406, filed Jul. 9, 2014, which is a national stage application of International Patent Application No. PCT/US2013/021262, filed Jan. 11, 2013, which claims the benefit of priority to U.S. Provisional Patent Application No. 61/588,392, filed Jan. 19, 2012. The entire contents of all the foregoing are hereby incorporated by reference.

BACKGROUND

Technical Field

This disclosure relates to relief valves, and more particularly, to relief valves for use in high pressure and ultrahigh pressure fluid pumps suitable for supplying pressurized fluid for fluid jet cutting and other activities.

Description of the Related Art

Numerous tasks, for example, cutting sheet metal or abrading a surface, may be accomplished through the use of a stream of pressurized fluid, typically water, which is generated by high pressure or ultrahigh pressure, positive displacement pumps, including, for example, those capable of generating pressurized fluid up to and beyond 87,000 psi and including over 100,000 psi. Such pumps pressurize a fluid by having a reciprocating plunger that draws the fluid from an inlet area into a pressurization chamber during an intake stroke, and acts against the fluid during a pumping stroke, thereby forcing pressurized fluid to pass from the pressurization chamber to an outlet chamber where it is collected to be used by an operator via whatever tool has been attached to the pump for a particular task.

During the normal course of operation, the required flow rate will vary from the maximum the pump can supply to zero, for example, when the operator turns the tool off. In this situation, where the pressurized fluid is not being used, the pressure in the outlet chamber will build up beyond an acceptable level unless some form of pressure control is incorporated into the pump. If no pressure control is provided, the buildup of pressure will result in damage and stress to the parts of the pump and undesirable surges of pressure will occur when the operator again turns the tool on.

One method of pressure control that is currently used is to incorporate a relief valve into the pump. When the pressure in the outlet chamber rises above a preset limit as a result of pressurizing more water than is demanded, the relief valve opens to vent the excess pressurized fluid. A relief valve may be direct acting, meaning that pressurized fluid acts directly to open a poppet that is being held in a closed position by a control force, such as, for example a spring or other biasing mechanism. Example relief valves are shown and described in U.S. Pat. No. 5,564,469, which is incorporated herein by reference in its entirety, and which is assigned to the assignee of the present application, Flow International Corporation of Kent, Wash. While currently available direct acting relief valves for high pressure and ultrahigh pressure pumps provide suitable relief under many operating conditions, in some instances, a pressure signal corresponding to the system pressure can oscillate unsatisfactorily above and below a desired pressure due to variations in the hydrostatic and hydrodynamic forces acting on the relief valve during operation. Applicants believe improved relief valves less susceptible to pressure oscillations are desirable.

BRIEF SUMMARY

The relief valve assemblies described herein are particularly well suited for use in high pressure and ultrahigh pressure pumps to provide pressure relief functionality in a manner that results in an exceptionally stable and consistent operating pressure.

According to one embodiment, a relief valve assembly may be summarized as including a valve pin having an engagement portion with a tapered surface and a valve seat configured to receive the valve pin. The valve seat includes a valve pin receiving aperture defining a tapered surface on the valve seat to sealingly mate with the engagement portion of the valve pin when the valve pin is seated against the valve seat in a seated configuration. The valve seat further includes at least one passage that extends from the valve pin receiving aperture to an exterior surface of the valve seat such that when the valve pin is displaced away from the seated configuration fluid can pass through the bypass passage and an annular space created between the engagement portion of the valve pin and the valve seat.

According to another embodiment, a valve seat operable with a tapered valve pin of a relief valve assembly may be summarized as including a valve pin receiving aperture defining a tapered surface on the valve seat that is configured to sealingly mate with a portion of the tapered valve pin when the tapered valve pin is seated against the valve seat in a seated configuration, and including at least one bypass passage that extends from the valve pin receiving aperture to an exterior surface of the valve seat such that, when the tapered valve pin is displaced away from the seated configuration during operation, fluid can simultaneously pass through the bypass passage and an annular space created between the tapered valve pin and the valve seat According to another embodiment, a fluid system may be summarized as including a pump operable to supply a source of fluid at high or ultrahigh pressures and a relief valve assembly, the relief valve assembly being in fluid communication with the source of fluid supplied by the pump and including a valve pin and a valve seat. The valve seat of the relief valve assembly includes a valve pin receiving aperture defining a surface on the valve seat that is configured to sealingly mate with a portion of the valve pin when the valve pin is seated against the valve seat in a seated configuration, and further includes at least one bypass passage that extends from the valve pin receiving aperture to an exterior surface of the valve seat such that, when the valve pin is displaced away from the seated configuration during operation, fluid supplied by the pump can simultaneously pass through the bypass passage and a primary relief passage created between the valve pin and the valve seat. The system may further include a waterjet cutting apparatus configured to receive high pressure or ultrahigh pressure fluid from the pump, the pressure of the fluid being regulated at least in part by the relief valve assembly.

BRIEF DESCRIPTION OF THE SEVERAL VIEWS OF THE DRAWINGS

FIG. 1 is an isometric view of a relief valve assembly, according to one example embodiment.

FIG. 2 is a partial, enlarged isometric view of the relief valve assembly of FIG. 1.

DETAILED DESCRIPTION

Figure 3:
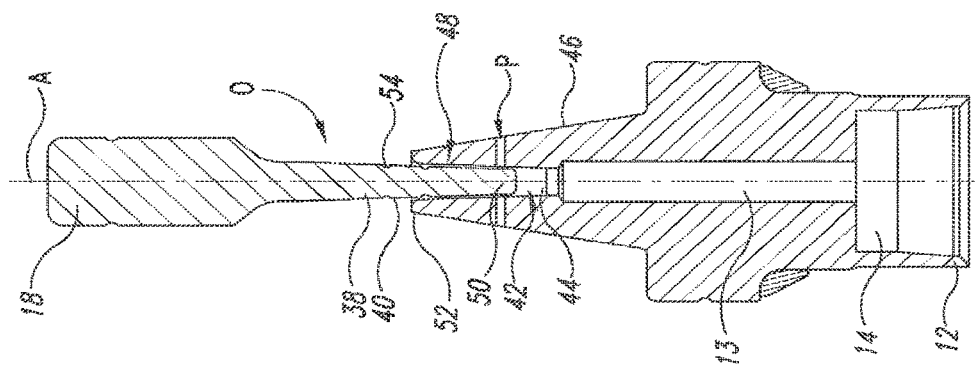
FIG. 3 is an isometric cross-sectional view of a poppet or valve pin received in a valve seat of the relief valve assembly of FIG. 1.

In the following description, certain specific details are set forth in order to provide a thorough understanding of various disclosed embodiments. However, one of ordinary skill in the relevant art will recognize that embodiments may be practiced without one or more of these specific details. In other instances, well-known structures associated with high pressure and ultrahigh pressure fluid systems, including high pressure and ultrahigh pressure pumps, relief valves and components thereof, may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIGS. 1 and 2 show a relief valve assembly 10 according to one example embodiment. The relief valve assembly 10 is operable with a high pressure or ultrahigh pressure pump (not shown) or other fluid system to provide pressure relief functionality with respect to operating pressures up to and beyond 87,000 psi and including over 100,000 psi. During operation, the pump pressurizes fluid, typically water, to pressures up to and beyond 87,000 psi, the pressurized fluid being collected and used by an operator via a tool (not shown) selected for a particular task, such as, for example, fluid jet cutting via a fluid jet nozzle. During the normal course of operation, the required flow rate will vary from the maximum the pump can supply to zero, for example, when the operator turns off the tool connected to the pump. In the situation where more fluid is pressurized than is demanded, the relief valve assembly 10 operates to vent excess pressurized fluid, thereby preventing a buildup of pressure which could otherwise result in damage and stress to parts of the pump and undesirable surges of pressure when the tool is reactivated.

As shown in FIGS. 1 and 2, the relief valve assembly 10 is provided with a female valve seat 12 which is configured to be in fluid communication with a source of pressurized fluid (e.g., a high pressure or ultrahigh pressure pump) via inlet conduit 13 and inlet port 14, as represented by the arrow labeled 16. A male poppet or valve pin 18 is provided to mate with the valve seat 12, the valve pin 18 being urged into contact with the valve seat 12 by a control force that is generated by a pneumatic actuator 20 acting on the valve pin 18 via a plunger 22 or other suitable biasing arrangement.

As shown in FIG. 1, a significant portion of the valve pin 18 is positioned within the valve seat 12 to sealingly engage the valve seat 12 in a seated configuration S. When the pressure of the fluid increases sufficiently to overcome the control force, the valve pin 18 is forced to move in the direction of the fluid flow sufficiently to create clearance between the valve pin 18 and the valve seat 12, thereby allowing a volume of pressurized fluid to pass through the valve seat 12 to an outlet chamber 26 of a housing 28 enclosing the interface of the valve seat 12 and valve pin 18 and ultimately through an outlet passage 30 of an outlet adapter 32 coupled to the housing 28, as represented by the arrow labeled 34.

Figure 4:
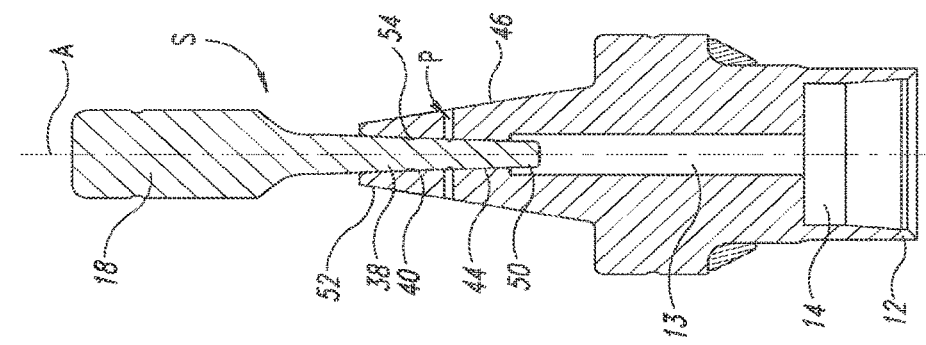
FIG. 4 is a cross-sectional elevational view of the valve pin and valve seat of the relief valve assembly of FIG. 1 shown in a seated configuration.
Figure 5:
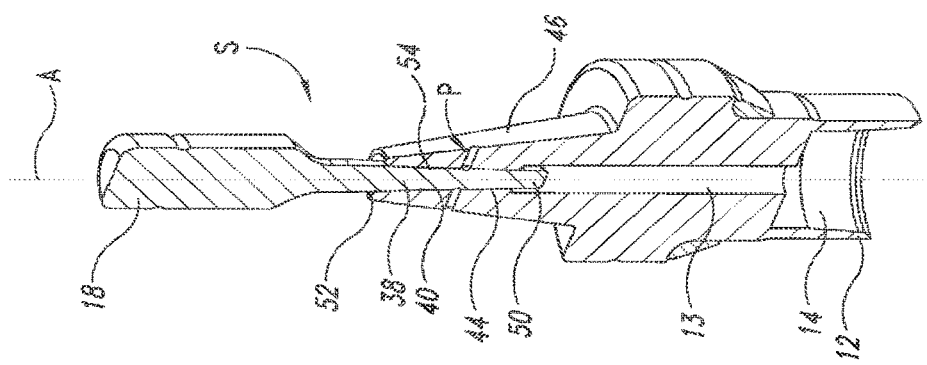
FIG. 5 is a cross-sectional elevational view of the valve pin and valve seat of the relief valve assembly of FIG. 1 shown in an open configuration.

FIGS. 3 through 5 illustrate further details of the valve seat 12 and valve pin 18. As shown, the valve pin 18 includes an elongated engagement portion 38 with a tapered surface 40. The valve seat 12 has a valve pin receiving aperture 42 (FIG. 5) defining a tapered surface 44 on the valve seat 12 to sealingly mate with the engagement portion 38 of the valve pin 18 when the valve pin 18 is seated against the valve seat 12 in the seated configuration S (FIGS. 1 through 4). The valve seat 12 further includes at least one bypass passage P that extends from the valve pin receiving aperture 42 to an exterior surface 46 of the valve seat 12 such that, when the valve pin 18 is displaced away from the seated configuration S (FIGS. 1 through 4) to an open configuration O (FIG. 5), fluid can pass through the bypass passage P and an annular space 48 created between the engagement portion 38 of the valve pin 18 and the valve seat 12. It will be understood that the valve pin 18 may be displaced to varying degrees based on changes in system pressure to create the space 48 through which pressurized fluid can escape, thereby forming a variable orifice mechanism. Accordingly, the space 48 may also be referred to as a variable orifice.

The bypass passage P may be positioned such that, when the valve pin 18 is seated against the valve seat 12 in the seated configuration S, the bypass passage P is completely obstructed by the valve pin 18. As the valve pin 18 moves away from the seated configuration S, a terminal end 50 of the valve pin moves toward the bypass passage P and opens the space 48 uncovering the bypass passage P. In some embodiments, when the valve pin 18 is in a fully open position O, the terminal end 50 of the valve pin 18 may remain upstream of the bypass passage P, as shown in FIG. 5. In other embodiments, the terminal end 50 of the valve pin 18 may move past the entrance to the bypass passage P.

In some embodiments, the valve seat 12 may include a plurality of bypass passages P that extend from the valve pin receiving aperture 42 to the exterior surface 46 of the valve seat 12. The bypass passages P may be circumferentially spaced around a central axis A of the valve seat 12 in regular intervals or irregular intervals. For example, the valve seat 12 may include two, three, four or more bypass passages P circumferentially spaced around the central axis A in regular intervals. In some embodiments, including the example embodiment of FIGS. 1 through 5, the valve seat 12 may include opposing bypass passages P defined by a linear, cross-drilled hole extending completely through an end 52 of the valve seat 12. The bypass passages P may extend perpendicular to a central axis A of the valve seat 12. In other embodiments, the bypass passages P may extend through the valve seat 12 non-orthogonally with respect to the central axis A. The bypass passages P may have a constant cross-sectional profile or may have a cross-sectional profile that varies over a length thereof.

According to some embodiments, the bypass passage P has a diameter that is less than an average diameter of the valve pin receiving aperture 42 at a region where the bypass passage P intersects the valve pin receiving aperture 42. In other embodiments, the bypass passage P may have a diameter that is equal to or less than one-third of an average diameter of the valve pin receiving aperture 42 at a region where the bypass passage P intersects the valve pin receiving aperture P. For example, the bypass passage P may have a diameter of 0.035±0.005 inch and an average diameter of the valve pin receiving aperture 42 at a region where the bypass passage P intersects the valve pin receiving aperture 42 may be 0.150±0.010 inch.

According to some embodiments, the bypass passage is offset from the terminal end 52 of the valve seat 12 to intersect the valve pin receiving aperture 42 at a position corresponding to a central region of the engagement portion 38 of the valve pin 18 when the valve pin 18 is in the seated configuration S. In some instances, for example, the bypass passage P may intersect the valve pin receiving aperture 42 at about 0.270±0.030 inch from the terminal end 52 of the valve seat 12 and the engagement portion 38 of the valve pin 18 may extend at least about 0.40 inch into the end 52 of the valve seat 12.

By providing an additional upstream passage (i.e., bypass passage P) for fluid exiting through the variable orifice 48 of the control valve assembly 10, a pressure signal corresponding to the system pressure is found to be substantially stabilized relative to a similar configuration lacking such a bypass passage P by significantly changing the dynamics of the system. In other words, the bypass passage P may substantially minimize fluctuations in the pressure signal by enabling fluid to pass through the bypass passage P and variable orifice 46 simultaneously during operation. The introduction of the bypass passage P can also have the beneficial impact of reducing the air pressure that is required in the pneumatic actuator 20 (FIG. 1) to bias the valve pin 18 toward the seated configuration S with the appropriate force. For example, in some embodiments, the presence of the bypass passage P enables at least a ten percent reduction in the operating pressure of the pneumatic actuator 20 relative to a similarly constructed relieve valve assembly which lacks such a bypass passage P. In other embodiments, the control force for biasing the valve pin 18 toward the seated configuration S may be supplied by a spring assembly or other biasing arrangement (rather than a pneumatic actuator 20), and the force supplied by the spring assembly or other biasing arrangement may be appreciably reduced relative to a similarly constructed relieve valve assembly which lacks a bypass passage P.

As discussed earlier, a housing 28 (FIGS. 1 and 2) may enclose the interface of the valve seat 12 and valve pin 18 and define an outlet chamber 26. The valve seat 12 may be positioned within the housing 28 such that, when the valve pin 18 is displaced away from the seated configuration S, the bypass passage P and the annular space 48 created between the engagement portion 38 of the valve pin 18 and the valve seat 12 are each in fluid communication with the outlet chamber 26.

In some embodiments, the tapered surface 44 of the valve seat 12 defined by the valve pin receiving aperture 42 may have a draft angle between about two and about five degrees at least in an immediate area next to where the bypass passage P intersects the valve pin receiving aperture 42. In other embodiments, the draft angle may be less than two degrees or greater than five degrees. In a similar fashion, the tapered surface 40 of the engagement portion 38 of the valve pin 18 may have a draft angle between about two and about five degrees, or may have a draft angle less than two degrees or greater than five degrees. Irrespective of the particular draft angles, the tapered surface 44 of the valve seat 12 defined by the valve pin receiving aperture 42 is nevertheless sized to sealingly receive the engagement portion 38 of the valve pin 18 in the seated configuration S.

In some embodiments, the valve pin 18 may be inserted in the valve seat 12 to a substantial degree when in the seated configuration S, such as, for example, at least about 0.40 inches. It is believed that by dissipating the energy of the pressurized fluid over a relatively large surface area created by the tapered surface 40 of the valve pin 18 and the tapered surface 44 of the valve seat 12, the energy may be dissipated relatively more slowly, thereby minimizing the destructive effects of erosion and cavitation caused by rapid pressure changes.

To further enhance the performance of the relief valve assembly 10, annular grooves 54 may also be provided on the valve pin 18. In some embodiments, at least one annular groove 54 may be positioned at or near the bypass passage P when the valve pin 18 is seated against the valve seat 12 in the seated configuration S. A small change in the bypass flow rate across a valve pin 18 having grooves 54 can advantageously result in a significantly smaller pressure change as compared to a similar valve pin 18 without such grooves 54. It is believed that by providing grooves 54 on the valve pin 18, the fluid flow is better maintained in a turbulent condition. In some embodiments, the valve pin 18 may also be provided with a wear-resistant coating, such as, for example, titanium nitride.

As illustrated in FIGS. 3 through 5, the exterior surface 46 of the valve seat 12 proximate to the valve pin receiving aperture 42 may be tapered in an opposite direction to that of valve pin receiving aperture 42, such that a ratio of the outer diameter of the valve seat 12 proximate the valve pin receiving aperture 42 to a diameter of valve pin receiving aperture 42 is greater in an upstream direction of fluid flow.

Although dimensions of the components described herein may vary depending on operating conditions and other factors, in one example embodiment, the valve seat 12 has a valve pin receiving aperture 42 that is about 0.45 inch long, having an inner diameter at its smallest end of about 0.09 inch and a draft angle of about 2.2 degrees; the engagement portion 38 of the valve pin 18 is about 0.55 inch long, having a diameter of 0.08 inch at its smallest end and a draft angle of about 2.2 degrees; and the bypass passage P of the valve seat 12 has a diameter of about 0.035 inch and is located about 0.27 inch from the end 52 of the valve seat 12. In other embodiments, a relief valve assembly 10 may have a valve seat 12 and a valve pin 18 with features that are scaled to handle a larger or smaller flow rate than the embodiment described immediately above.

Although the relief valve assemblies 10 and components thereof described herein have been discussed in the context of high pressure and ultrahigh pressure fluid pumps, it is appreciated that aspects of the same may be applicable to other high pressure fluid systems and applications. Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A relief valve assembly comprising:
a valve pin having an engagement portion with a tapered surface; and
a valve seat having a valve pin receiving aperture defining a tapered engagement surface on the valve seat to sealingly mate with the engagement portion of the valve pin when the valve pin is seated against the valve seat in a seated configuration, the valve seat further having at least one bypass passage that extends completely through a lateral side wall of the valve seat from the valve pin receiving aperture through the tapered engagement surface of the valve seat to an exterior lateral side surface of the valve seat such that when the valve pin is displaced away from the seated configuration fluid can pass through the bypass passage and an annular space created between the engagement portion of the valve pin and the valve seat, the annular space providing a primary flow path out through a terminal end of the valve seat to an outlet of the relief valve assembly and the bypass passage providing a secondary flow path through a side of the valve seat to the outlet of the relief valve assembly that is distinct from the primary flow path, wherein the tapered engagement surface of the valve seat extends from the terminal end of the valve seat past an entrance of the bypass passage.

2. The relief valve assembly of claim 1, further comprising:
a housing having a fluid outlet chamber, the valve seat positioned within the housing such that when the valve pin is displaced away from the seated configuration the bypass passage and the annular space created between the engagement portion of the valve pin and the valve seat are each in fluid communication with the fluid outlet chamber.

3. The relief valve assembly of claim 1 wherein the tapered engagement surface of the valve seat defined by the valve pin receiving aperture has a draft angle between about two and about five degrees at least in an immediate area next to where the bypass passage intersects the valve pin receiving aperture.

4. The relief valve assembly of claim 1 wherein, when the valve pin is seated against the valve seat in the seated configuration, the bypass passage is completely obstructed by the valve pin.

5. The relief valve assembly of claim 1 wherein, when the valve pin is displaced away from the seated configuration, a terminal end of the valve pin remains upstream of the bypass passage.

6. The relief valve assembly of claim 1 wherein the valve seat includes a plurality of bypass passages that extend from the valve pin receiving aperture to the exterior lateral side surface of the valve seat.

7. The relief valve assembly of claim 1 wherein the valve seat includes opposing bypass passages defined by a linear, cross-drilled hole extending completely through an end of the valve seat.

8. The relief valve assembly of claim 1 wherein the bypass passage has a diameter that is less than an average diameter of the valve pin receiving aperture at a region where the bypass passage intersects the valve pin receiving aperture.

9. The relief valve assembly of claim 1 wherein the bypass passage has a diameter that is equal to or less than one-third of an average diameter of the valve pin receiving aperture at a region where the bypass passage intersects the valve pin receiving aperture.

10. The relief valve assembly of claim 1 wherein the bypass passage has a diameter of 0.035±0.005 inch and an average diameter of the valve pin receiving aperture at a region where the bypass passage intersects the valve pin receiving aperture is 0.150±0.010 inch.

11. The relief valve assembly of claim 1 wherein the bypass passage intersects the valve pin receiving aperture at about 0.270±0.030 inch from the terminal end of the valve seat.

12. The relief valve assembly of claim 1 wherein the valve pin receiving aperture defines a central axis and the bypass passage extends perpendicular to the central axis.

13. The relief valve assembly of claim 1 wherein a plurality of annular grooves are provided on the tapered surface of the engagement portion of the valve pin, and wherein at least one of the annular grooves is positioned at or near the bypass passage when the valve pin is seated against the valve seat in the seated configuration.

14. The relief valve assembly of claim 1 wherein the valve seat includes a fluid inlet conduit that is in fluid communication with the valve pin receiving aperture, and wherein the valve pin is positioned to be exposed to fluid having variable pressure within the fluid inlet conduit of the valve seat during operation such that, when the pressure of the fluid is sufficient to overcome a control force which biases the valve pin toward the seated configuration, the valve pin is forced to move away from the seated configuration to create the annular space, thereby allowing the fluid to pass through the annular space and the bypass passage simultaneously.

15. The relief valve assembly of claim 14 wherein the bypass passage is configured to stabilize a pressure signal corresponding to the pressure of the fluid when fluid passes through the bypass passage during operation.

16. The relief valve assembly of claim 14 wherein the bypass passage is configured to reduce the fluctuation in a pressure signal corresponding to the pressure of the fluid when the fluid passes through the bypass passage during operation.

17. The relief valve assembly of claim 14 wherein the valve pin is biased toward the seated configuration by a pneumatic actuator, and wherein the bypass passage is sized to provide at least a ten percent reduction in the operating pressure of the pneumatic actuator relative to a relieve valve assembly that lacks a bypass passage but is otherwise identical.

18. A valve seat operable with a tapered valve pin of a relief valve assembly, the valve seat comprising:
a valve pin receiving aperture defining a tapered engagement surface on the valve seat that is configured to sealingly mate with a portion of the tapered valve pin when the tapered valve pin is seated against the valve seat in a seated configuration; and
at least one bypass passage that extends completely through a lateral side wall of the valve seat from the valve pin receiving aperture through the tapered engagement surface of the valve seat to an exterior lateral side surface of the valve seat such that, when the tapered valve pin is displaced away from the seated configuration during operation, fluid can simultaneously pass through the bypass passage and an annular space created between the tapered valve pin and the valve seat, the annular space providing a primary flow path out through a terminal end of the valve seat to an outlet of the relief valve assembly and the bypass passage providing a secondary flow path through a side of the valve seat to the outlet of the relief valve assembly that is distinct from the primary flow path, wherein the tapered engagement surface on the valve seat extends from the terminal end of the valve seat past an entrance of the bypass passage.

19. The valve seat of claim 18 wherein the tapered engagement surface of the valve seat defined by the valve pin receiving aperture has a draft angle between about two and about five degrees at least in an immediate area next to where the bypass passage intersects the valve pin receiving aperture.

20. The valve seat of claim 18 wherein the bypass passage has a diameter that is less than an average diameter of the valve pin receiving aperture at a region where the bypass passage intersects the valve pin receiving aperture.

21. A system comprising:
a pump operable to supply a source of fluid at high or ultrahigh pressures; and
a relief valve assembly in fluid communication with the source of fluid supplied by the pump, the relief valve assembly including a valve pin and a valve seat, the valve seat having a valve pin receiving aperture defining a tapered engagement surface on the valve seat that is configured to sealingly mate with a portion of the valve pin when the valve pin is seated against the valve seat in a seated configuration, and the valve seat having at least one bypass passage that extends completely through a lateral side wall of the valve seat from the valve pin receiving aperture through the tapered engagement surface to an exterior lateral side surface of the valve seat such that, when the valve pin is displaced away from the seated configuration during operation, fluid supplied by the pump can simultaneously pass through the bypass passage and a primary relief passage created between the valve pin and the valve seat, the primary relief passage providing a primary flow path out through a terminal end of the valve seat to an outlet of the relief valve assembly and the bypass passage providing a secondary flow path through a side of the valve seat to the outlet of the relief valve assembly that is distinct from the primary flow path, wherein the tapered engagement surface on the valve seat extends away from the terminal end of the valve seat past an entrance of the bypass passage.

22. The system of claim 21, further comprising:
a waterjet cutting apparatus configured to receive high pressure or ultrahigh pressure fluid from the pump, the pressure of the fluid being regulated at least in part by the relief valve assembly.

23. The system of claim 21 wherein the valve pin receiving aperture defines a central axis and the bypass passage extends perpendicular to the central axis.

24. The system of claim 21 wherein a plurality of annular grooves are provided on the portion of the valve pin, and wherein at least one of the annular grooves is positioned at or near the bypass passage when the valve pin is seated against the valve seat in the seated configuration.

* * * * *